(12) United States Patent
Wetherell et al.

(10) Patent No.: US 8,190,012 B2
(45) Date of Patent: May 29, 2012

(54) OPTICAL SYSTEM WITH ADJUSTABLE SHIMS

(75) Inventors: Thomas J. Wetherell, Colorado Springs, CO (US); Byron B. Taylor, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 456 days.

(21) Appl. No.: 12/556,625

(22) Filed: Sep. 10, 2009

(65) Prior Publication Data

US 2012/0063760 A1  Mar. 15, 2012

(51) Int. Cl.
*G03B 13/00* (2006.01)
(52) U.S. Cl. .......................................................... 396/97
(58) Field of Classification Search .................. 396/97, 396/427, 231
See application file for complete search history.

(56) References Cited

U.S. PATENT DOCUMENTS

| | | | | |
|---|---|---|---|---|
| 4,010,365 | A | * | 3/1977 | Meyers et al. ............... 250/236 |
| 5,228,703 | A | * | 7/1993 | White ............................ 277/644 |
| 5,391,875 | A | * | 2/1995 | Cederberg et al. ............ 250/352 |
| 5,551,244 | A | * | 9/1996 | Bailey .............................. 62/51.2 |
| 5,895,129 | A | * | 4/1999 | Ohta ............................... 396/79 |
| 2002/0185586 | A1 | * | 12/2002 | Majewski et al. ........... 250/208.1 |
| 2005/0140792 | A1 | * | 6/2005 | Hermsen .................... 348/208.12 |
| 2006/0045504 | A1 | * | 3/2006 | Zarnowski et al. .............. 396/79 |

FOREIGN PATENT DOCUMENTS

JP  2003032537 A  1/2003

OTHER PUBLICATIONS

International Search Report and Written Opinion from corresponding International Application No. PCT/US10/38098.

* cited by examiner

*Primary Examiner* — Clayton E Laballe
*Assistant Examiner* — Warren Fenwick
(74) *Attorney, Agent, or Firm* — Renner, Otto, Boisselle & Sklar, LLP

(57) ABSTRACT

An optical system includes actuators in a coupling between a detector, such as a focal plane array, and a frame (mount) that supports the detector. The actuators may be actuated piezoelectric shims that can have their thickness adjusted by applying a voltage to them. The adjustment of the thickness of the actuators (shims) may be used to control tilt and focus (axial position) of the detector relative to the frame (and other parts of the optical system). The optical system may be part of a flying vehicle, such as a spacecraft or aircraft, for instance a missile. The system may include a temperature sensor, and a control system that adjusts the thickness the actuated shims based on temperature, for example using a lookup table.

20 Claims, 3 Drawing Sheets

OPTICAL SYSTEM WITH ADJUSTABLE SHIMS

BACKGROUND OF THE INVENTION

1. Technical Field of the Invention

The invention is in the field of optical systems for aircraft, such as seekers for missiles.

2. Description of the Related Art

Traditionally missiles have used metallic shims in their infrared seekers, the parts of missiles used to home in on a target. The process has involved placing nominal or best-guess shims into the system, taking measurements on a test station, and then iteratively changing shims and taking further measurements until satisfactory performance is obtained.

SUMMARY OF THE INVENTION

According to an aspect of the invention, electrically-controlled adjustable shims (actuators) may be used to control positioning of a focal plane array (or other detector) of an optical system. The adjustable shims may be piezoelectric actuators, which may be used to control tilt of the focal plane array or other detector, to achieve a predetermined planarity requirement for the detector, or when commanded to an equal value, the focus or axial position of the detector. The detector and shims may be parts of an aircraft or spacecraft optical system, for example being parts of an infrared seeker of a missile. The shims may be operatively coupled to a controller, which in turn may be coupled to a temperature sensor, in order to maintain the desired position and planarity of the detector throughout changes in temperature, such as the temperature changes that may be encountered in flight.

According to another aspect of the invention, a method for controlling an optical system that moves through a changing environment, includes the steps of: sensing changes in the environment; and adjusting thicknesses of one or more adjustable shims of the optical system to adjust positioning of a detector of the optical system relative to a mount of the optical system, to compensate for the changes in the environment.

According to yet another aspect of the invention, an optical system that is part of a flying projectile, includes: a detector; optics that direct light toward the detector; and adjustable shims that adjust tilt of the detector relative to the optics.

To the accomplishment of the foregoing and related ends, the following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

DETAILED DESCRIPTION

An optical system includes actuators in a coupling between a detector, such as a focal plane array, and a frame (mount) that supports the detector. The actuators may be actuated piezoelectric shims that can have their thickness adjusted by applying a voltage to them. The adjustment of the thickness of the actuators (shims) may be used to control tilt and focus (axial position) of the detector relative to the frame (and other parts of the optical system). The optical system may be part of a flying vehicle, such as a spacecraft or aircraft, for instance being an infrared seeker of a missile. The system may include a temperature sensor, and a control system that adjusts the thickness the actuated shims based on temperature, for example using a lookup table. The system thus may be able to adjust itself in response to changes in environment, such as changes in temperature, that are encountered during use of the system. By using the actuatably adjustable shims, such as piezoelectric shims, a range of adjustment is possible during operation. Also, there is no need for swapping out different thicknesses of fixed (non-adjustable) shims in order to achieve the desired configuration of the system, for example a desired lack of tilt of a focal plane array or other detector. By use of the adjustable shims a desired parallelism of the detector relative to a mount or other parts of the system may be easily, reliably, and repeatably achieved over a range of operating conditions. Also, refocusing the system may be accomplished to maintain optimum system performance due to changes in range/distance to the object of interest.

Figure 1:
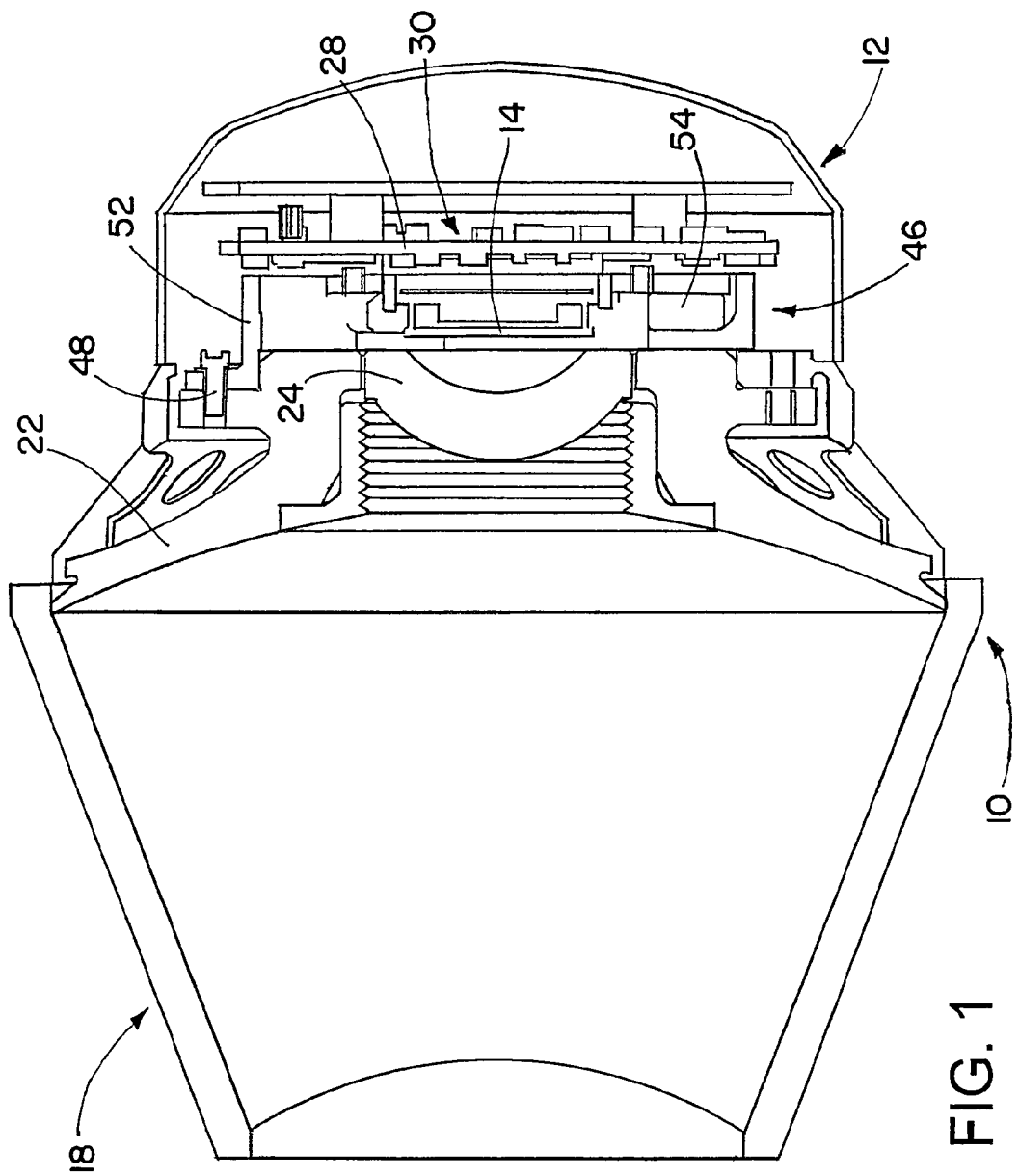
FIG. 1 is a side sectional view of an optical system in accordance with an embodiment of the invention.
Figure 2:
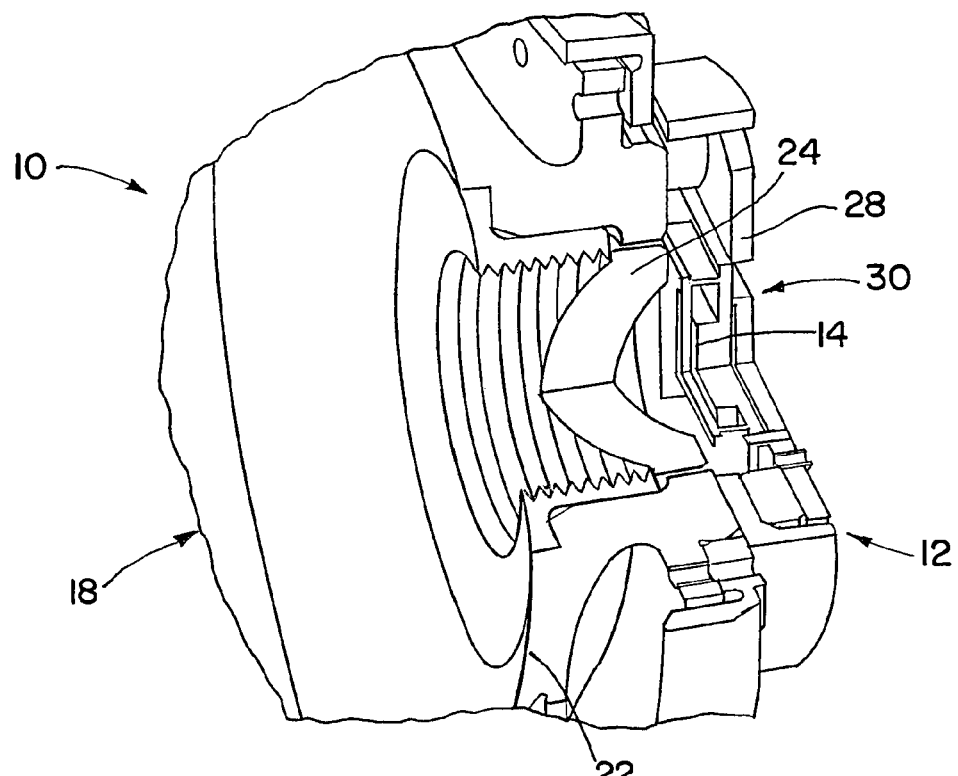
FIG. 2 is an oblique cutaway view of the optical system of FIG. 1.

Referring initially to FIGS. 1 and 2, an optical system 10 includes a camera assembly 12 that includes a detector 14, and optics 18 for receiving and focusing incoming light on the detector 14. The term "light," as used herein, is interpreted broadly to include a broad range of wavelengths of radiation, including those beyond the visible spectrum, for example including infrared radiation. The optical system 10 thus may be in infrared seeker, although it will be appreciated that the optical system 10 may be configured for detecting other wavelengths of non-visible or visible radiation.

The optics 18, only some of which are shown, include a primary mirror 22 and a relay lens 24. The primary mirror 22 works in concert with other mirrors (not shown) to concentrate radiation incident on the optical system 10, for example radiation entering through a radome (not shown). The relay lens 24 focuses the light concentrated by the mirrors toward the detector 14. An example detector 14 is a focal plane array, for example a rectangular array have pixels sensitive to infrared radiation or other light, such as a charge coupled device (CCD). The system 10 also includes electronics 28, for example embodied as one or more circuit card assemblies (CCAs). The electronics 28 may be used to receive and perhaps process information received by the detector 14. In addition the electronics 28 may be part of a control system 30 for controlling positioning of the detector 14, for example controlling tilt of the detector 14, as described further below.

Figure 3:
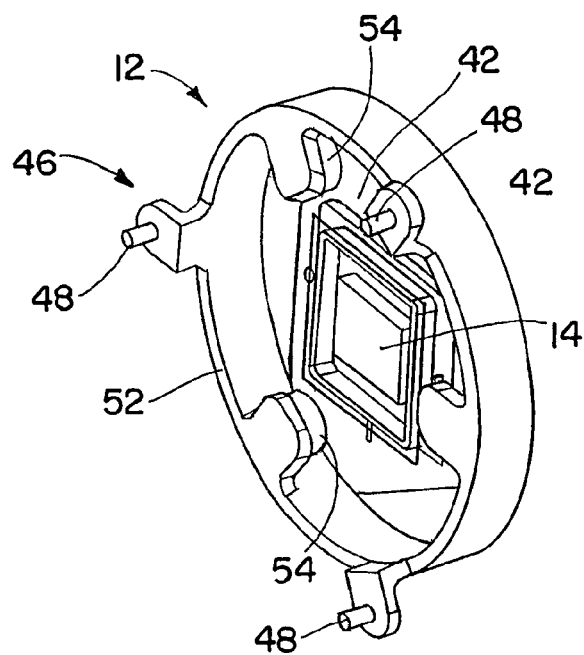
FIG. 3 is an oblique view of parts of the optical system of FIG. 1, namely a camera mount and a detector assembly.
Figure 4:
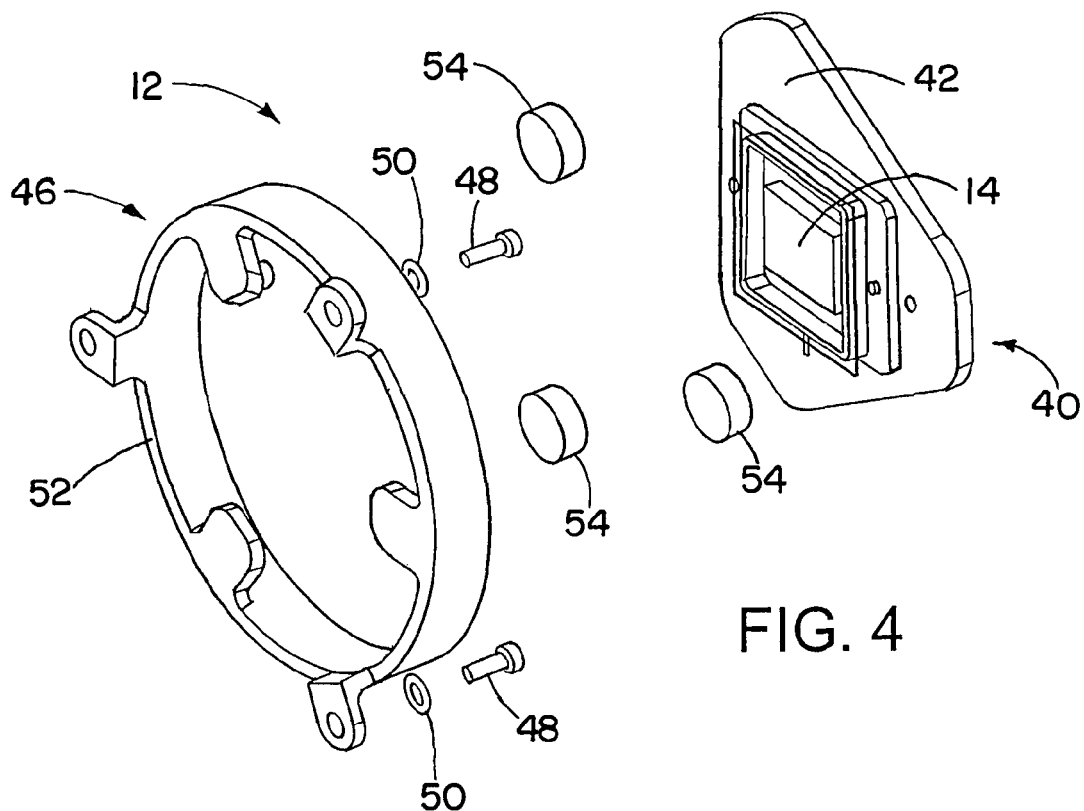
FIG. 4 is an exploded view of the parts shown in FIG. 3.

With reference now in addition to FIGS. 3 and 4, further details are given of the configuration of the camera assembly 12. The camera assembly 12 includes a detector assembly 40 that in turn includes the detector 14 and a heat sink 42. The detector 14 is coupled to the heat sink 42 in order to allow the heat sink 42 to dissipate heat produced by the detector 14 during operation of the detector 14. The detector assembly 40 is coupled to a camera mount 46, which is used to mechanically couple the camera assembly 12 to the primary mirror 22, to hold the camera assembly 12 in place. Three threaded fasteners 48, with accompanying washers 50, are used to secure the camera mount 46 to the primary mirror 22. The detector assembly 40 is coupled to the camera mount 46 inboard of (radially inward relative to) a ring 52 of the camera mount 46. The camera mount 46 is coupled to the primary mirror 22 outboard of (radially outward relative to) the ring 52.

A set of actuatable shims 54 is located between the detector assembly 40 and the camera mount 46. The shims 54 may be secured using any of a variety of suitable means or mechanisms, for instance using adhesive, screws, or threaded retaining rings. The actuatable shims 54 are actuable in that they have thicknesses that may be selectively changed. The actuatable shims 54 may all be substantially identical to one another, and may have cylindrical shapes, with flats of the cylinders against surfaces of the heat sink 42 and the camera mount 46. The actuatable shims 54 may be made of a piezoelectric material, able to change shape by application of a voltage across them. By changing the thicknesses of the individual shims 54, the position of the detector 14 may be changed relative to the optics 18, such as relative to the relay lens 24. In particular, the actuable shims 54 may be used to position the detector 14 in the focal plane of the relay lens 24, with a desired planarity. The shims 54 may be used to control the tilt of the detector 14, to control the planarity of the detector 14 relative to the relay lens 24 and other parts of the optical system 10. The desired planarity for the detector 14 may be below a predetermined planarity limit, such as below 1.5 milliradians (mrad).

In addition the shims 54 may all change thickness at the same time, to change the vertical position of the detector 14 relative to the optics 18. This changes the focus of the system, allowing refocusing of the system to maintain optimum system performance due to changes in range/distance to the object of interest.

As already noted, the actuable shims 54 may be made of a piezoelectric material that provides a variable force for a variable thickness, as a function of a voltage provided across the piezoelectric material. The shims 54 may be cylindrical piezoelectric material slabs, with electrodes provided to apply a variable voltage across the piezoelectric material slabs. Piezoelectric actuators have the advantage of high reliability and small size and weight. In addition piezoelectric actuators may have the advantage of maintaining position even in a power-off condition, with no voltage applied. A wide variety of suitable commercially-available piezoelectric actuators are available.

It will be appreciated that other alternatives are possible for the actuable shims 54. For example voice coils may be used instead of the piezoelectric material actuable shims. Voice coils may be used to change the thickness of the actuable shims by varying the electric current applied to the coils, thereby increasing or decreasing the overall thickness of the voice coils by relatively moving parts of the same coil. Other possibilities include using wiggle motors (rotary motors) with piezoelectric material, and small pico motors (stepper motors with piezoelectric material).

The use of the actuable shims 54 provides many benefits to the optical system 10. The time-consuming process of swapping out difference thicknesses of fixed non-actuable (constant-thickness) shims is avoided. Since the actuable shims 54 do not need to be accessible in order to allow swapping out, the actuable shims 54 can be located in inaccessible places within the optical system 10. This means that the actuable shims 54 can be located so as to move a smaller portion of the optical system 10 when actuated, relative to the amount of prior optical systems tilted by their constant-thickness shims. For example, the actuable shims 54 may be configured to tilt only the detector assembly 40, including the detector 14 and the heat sink 42. It will be appreciated that it is advantageous to have to move less mass with the actuable shims 54—less mass to be moved means that less force is required from the actuable shims 54. Less mass also results in faster response of the servo control system to point and stabilize the entire optical sensor package.

In addition, the use of actuable shims 54 allows the optical system 10 to perform better over a range of conditions, such as a range of temperature. The thickness of the individual actuable shims 54 may be varied, by varying the electrical signal applied to the actuable shims 54, to adjust the tilt and or positioning of the detector 14. This puts the detector 14 in a desired planarity and in a desired location relative to the relay lens 24, such as at or near the focal plane of the relay lens 24. By enabling movement of the detector 14 during operation of the optical system 10 it will be appreciated that materials for the optical system 10 may be selected without the same regard as in prior systems for matching the coefficient of thermal expansion of different parts of the optical system 10 or matching changes in index or refraction over temperature. Different coefficients of thermal expansion may be used for different parts because the adjustable shims 54 may be adjusted in situ to control the positioning (including tilt) of the detector 14 when different parts of the system 10 expand or contract at different rates. A greater range of material choices for optics and support structures may allow the designer to choose a lower cost material, and/or one which may be fabricated more easily.

Figure 5:
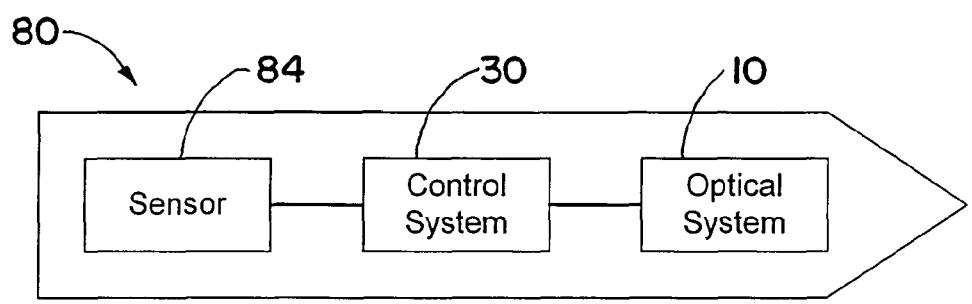
FIG. 5 is a schematic view of the optical system of FIG. 1, as part of an aircraft such as a missile.

Referring now to FIG. 5, the optical system 10 is part of a projectile 80, such as a missile, for example being an infrared seeker of the missile. The optical system 10 is operatively coupled to the control system 30 that is used to control the adjustable shims 54 (FIG. 3). The control system 30 in turn may be coupled to a sensor 84 (or multiple sensors) that provides information that is used by the control system 30. The sensor 84 may be an environment sensor, such as a temperature sensor (for example a thermocouple or resistance temperature detector), that provides information about the environment experienced by the optical system 10. The sensor 84 may detect information about the environment inside and/or outside of the projectile 80, providing information to the control system 30 that may be used in adjusting the adjustable shims 54. As another alternative, the sensor 84 may sense range to the target, so that the system may be refocused for optimum optical system performance.

The control system 30 may use any of a variety of mechanisms to adjust the shims 54 to maintain the detector 14 (FIG. 3) in the proper position. As one example, a lookup table may be used in order to provide appropriate signals for the adjustable shims 54 at certain temperatures. When a temperature is detected by the sensor 84 (multiple sensors may be employed), the control system 30 compares the temperature to stored values of voltages or other signals to be applied to the adjustable shims 54, in order to position the detector 14 correctly relative to other parts of the optical system 10. The determination of proper adjustable shim signals in the control system 30 may involve other processes, such as interpolation between values in the lookup table or other mechanism for storing data within the control system 30. Extrapolation beyond stored values may also be utilized. In addition, the control system 30 may convert data from one form to another, for example converting thicknesses for the adjustable shims 54 into voltage values for piezoelectric actuators that function as the adjustable shims 54.

It will be appreciated that alternatives to a lookup table are possible. For example the control system 30 may use one or more equations that directly convert temperature (or other environmental data) to the parameters needed to actuate the shims 54, to produce a desired location for the detector 14. Such conversion may be accomplished by suitable equations or tables, for example.

A lookup table for the control system 30 may be produced by testing of the optical system 10 in a controllable environment. The optical system 10 may be successively brought to different temperatures, with different voltages (or other signals) applied to the adjustable shims 54 to produced the desired location for the detector 14. It will be appreciated that each individual optical system 10 may be tested to provide the proper lookup table. Alternative and preferably, a lookup table produced by such a method may be utilized more generally, such as for all optical systems of similar configuration. It will be appreciated that similar methods may be used in determining other types of mechanisms for converting environmental data to appropriate positions for the adjustable shims 54.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for controlling an optical system that moves through a changing environment, the method comprising:
   sensing changes in the environment; and
   adjusting thicknesses of one or more adjustable shims of the optical system to adjust positioning of a detector of the optical system relative to a mount of the optical system, to compensate for the changes in the environment.

2. The method of claim 1,
   wherein the adjustable shims include piezoelectric actuators; and
   wherein the adjusting includes applying voltage to the one or more adjustable shims to obtain the desired thicknesses of the adjustable shims.

3. The method of claim 1, wherein the adjusting thickness adjusts tilt of the detector relative to optics of the optical system.

4. The method of claim 3, wherein the optical system has three adjustable shims.

5. The method of claim 1,
   wherein the sensing the changes includes sensing temperature of the environment; and
   wherein the adjusting includes selecting the thicknesses as a function of temperature.

6. The method of claim 5, wherein the selecting the thicknesses includes using a lookup table.

7. The method of claim 1,
   wherein the detector is a focal plane array; and
   wherein the adjusting includes adjusting the focal plane array to a planarity relative to optics of the optical system, such that the planarity is below a predetermined planarity limit.

8. The method of claim 7, wherein the predetermined planarity limit is less than or equal to 2.5 milliradians (mrad).

9. The method of claim 1,
   wherein the optical system is on a projectile; and
   wherein the sensing changes includes sensing during flight of the projectile.

10. The method of claim 1,
    wherein the optical system includes a camera mount with a ring; and
    wherein the detector is part of a detector assembly that is attached to the adjustable shims, which in turn are attached to the camera mount inboard of the ring.

11. The method of claim 10, wherein the camera mount is attached, outboard of the ring, to optics of the optical system.

12. An optical system that is part of a flying projectile, the optical system comprising:
    a detector;
    optics that direct light toward the detector; and
    adjustable shims that adjust tilt of the detector relative to the optics.

13. The optical system of claim 12,
    wherein the detector is part of a detector assembly that also includes a heat sink that is attached to the detector; and
    wherein changing thickness of the adjustable shims adjusts tilt of the detector assembly as a unit relative to the optics.

14. The optical system of claim 13,
    further comprising a camera mount with a ring;
    wherein the detector assembly is attached to the adjustable shims, which in turn are attached to the camera mount inboard of the ring.

15. The optical system of claim 14, wherein the camera mount is attached, outboard of the ring, to optics of the optical system.

16. The optical system of claim 12, wherein the optical system is a seeker that is part of a missile.

17. The optical system of claim 12, wherein the adjustable shims includes at least three adjustable shims.

18. The optical system of claim 12, wherein the adjustable shims include piezoelectric actuators.

19. The optical system of claim 12, wherein the detector is a focal plane array.

20. The optical system of claim 12, further comprising a temperature sensor operatively coupled to the adjustable shims so as to adjust thicknesses of the adjustable shims in response to changes in temperature.

* * * * *